3,790,664
FILM-FORMING ORGANIC POLYMER-MODIFIED STARCH MATERIAL HAIR SETTING COMPOSITION
David Arthur Krochock, Mundelein, and Donald David Laiderman, Deerfield, Ill., assignors to The Gillette Company, Boston, Mass.
No Drawing. Filed Oct. 16, 1970, Ser. No. 81,557
Int. Cl. A61k 7/10
U.S. Cl. 424—47   7 Claims

ABSTRACT OF THE DISCLOSURE

Composition for setting hair and simultaneously repressing or retarding development of an oily appearance containing a solution of a resin in a volatile solvent and dispersed in the solution a starch acid ester reacted with a polyvalent metal ion. A pressure propellant may be included.

---

This invention relates to a composition for setting hair and simultaneously repressing or retarding the development of an oily appearance in hair.

One of the common problems faced by many people is the development of an oily appearance of the hair because of the collection of oily sebaceous materials on the scalp and wicking of the oil along the hair fibers. While vigorous brushing tends to even out the distribution of natural oils, such brushing, which is required daily, is usually considered too onerous by most persons with long hair who prefer instead to shampoo away the continuing accumulation of oils, using either a conventional wet shampoo or a so-called "dry shampoo" which includes particles of talc or the like applied to the hair by means of a liquified gaseous propellant, the particles absorbing the oil and being removed by brushing.

Regular use of conventional style-holding or setting hair spray compositions, as is common today, aggravates the problem because the addition of the film forming material increases the total amount of material on the hair and necessitates even more frequent shampooing. Even when the accumulated film forming material is removed by brushing, the oil is not, resulting in a dull, matted appearance. In any event, the set holding character of the hair spray composition is destroyed by either brushing or shampooing.

The composition of the present invention provides both set-holding characteristics and also a decrease in or a repression of the tendency to develop oiliness in the hair. The composition comprises a conventional solution of film-forming resin in a volatile solvent of the type usually applied by spraying to provide set-holding characteristics, in which there is suspended or dispersed a modified starch material in the form of starch partially esterified with certain dicarboxylic acids and subsequently reacted with a polyvalent metal ion to convert the remaining carboxyl groups of the partial ester to salts, as described in U.S. Pat. 2,613,206, issued Oct. 7, 1952. The starch used as the starting material, as pointed out in that patent, may be of any type, including corn, potato, tapioca, sago, rice, wheat, corn or waxy maize, sweet potato or arrowroot and should be ungelatinized, that is, in the form of its original discrete granules. All such starches contain both amylose and amylopectin in varying proportions. The composition of the present invention is preferably packaged in a pressure container along with a liquified or gaseous propellant and is adapted to be dispensed in the form of a spray through the usual valve outlet.

Despite the fact that the modified starch material is insoluble in the resin solution and is present in the form of a dispersion of small particles having a diameter of the order of 5 to 25 microns, the film which is formed is not opaque or cloudy but is surprisingly clear. It has been found in addition that even though the continuity of the film is altered by the presence of starch material and the starch particles themselves are enveloped by the resin, the composition is effective both to provide the desired set-holding characteristics and also to absorb oil on the hair.

There may be used in the compositions of the present invention solutions of any film-forming organic polymers or resins conventionally employed in hair setting compositions such as polyvinyl pyrrolidone, copolymers of vinylpyrrolidone with vinyl acetate, partial esters of copolymers of vinyl alkyl ethers with maleic anhydride, dimethylhydantoin-formaldehyde condensation products, copolymers of vinyl acetate with crotonic acid, etc., dissolved in a volatile solvent such as ethyl alcohol, isopropyl alcohol, ethyl acetate, methylene chloride, 1,1,1-trichloroethane, 1,1,2-trichloro-1,2,2-trifluoroethane, or in mixtures of water with appropriate water miscible volatile organic solvents such as ethyl alcohol, etc. The solvent must be a liquid at room temperature and preferably vaporizes at least as rapidly as water at room temperature, i.e., it must have a boiling point from about 30° to about 95° C. Of these solvents, ethyl alcohol and mixtures of ethyl alcohol with up to 70% by weight of water are preferred. The amount of polymer or resin present may be conventional, within the range from 0.05 to 5%, preferably from 0.25 to 3% by weight of the total composition, including resin, modified starch material, solvents, propellants, etc. When resins containing acidic groups are used, organic bases such as amines can be used as solubilizers.

The modified starch material present in the composition may be any of those described in the above-identified patent and include starch acid-esters of a substituted dicarboxylic acid of the formula:

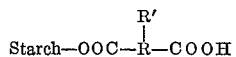

$$\text{Starch—OOC—}\underset{\underset{\text{R}'}{|}}{\text{R}}\text{—COOH}$$

in which R is a dimethylene or trimethylene and R' is a hydrocarbon group, i.e., alkyl, alkenyl, aralkyl, or aralkenyl, which acid-ester is further reacted with a compound containing a polyvalent metal ion. The R' substituent group, which is hydrophobic, may contain from 1 to 18 carbon atoms. The modified starch material is made by first reacting an ungelatinized starch with the appropriate acid anhydride or acid chloride such as decenyl succinic acid anhydride, heptyl glutaric acid anhydride, triisobutylene succinic anhydride, octadecenyl succinic acid chloride, octenyl succinic acid anhydride, nonenyl succinic acid anhydride, methylene succinic acid anhydride, and the like. The amount of dicarboxylic acid anhydride used may vary from 0.1 to 100% based on the dry weight of the starch, the proportion used varying with the degree of esterification or substitution of the starch which is desired; the maximum possible substitution involves reaction with all of the hydroxyl groups in the surface region of the starch granules. The compounds containing a polyvalent metal ion with which the acid-ester is further reacted include water-soluble salts of copper, mercury, aluminum, zirconium, iron, chromium, tin, calcium, barium, and strontium. The amount of such modified starch material present in the composition of the present invention can be from 0.05 to 5%, preferably from 0.2 to 1% by weight of the total composition including resins, solvents, propellants, etc. as well as modified starch material. The composition may include conventional plasticizers or softeners for the resin as well as perfumes, coloring agents, and a variety of hair conditioning agents such as fatty quaternary cationic surface-active agents, for example, stearyldimethylbenzyl ammonium chloride, various lanolin fractions, or fatty ester oils, for example, isopropyl myristate or silicone oil.

When the composition is packaged in a valved pressure container for dispensing by spraying, a conventional liquified or gaseous propellant is included in the package along with the foregoing ingredients as a part of the total composition. Any of the usual propellants may be employed. In particular, when the solvent is anhydrous, the halogenated hydrocarbon propellants are preferred because of their nonflammability; these include among others trichloromonofluoromethane, dichlorodifluoromethane, and dichlorotetrafluoroethane, as well as mixtures of two or more of them. Vinyl chloride may also be employed in admixture with any one or more of the foregoing in amounts up to 15 to 20% by weight of the total propellant. The halogenated hydrocarbon propellant generally amounts to 40 to 75% by weight of the total composition in such a package, the balance being the volatile solvent, film-forming resin together with softener, lustering agent, etc., and modified starch material. Liquified gaseous hydrocarbon propellants such as isobutane or n-butane may also be employed with either anhydrous or aqueous solvent compositions. In general, such hydrocarbon propellants need be present in the pressure package only in amounts somewhat less than 25% by weight of the total composition, the balance being of the mixture of solvent, resin together with softener and lustering agent, etc., and modified starch material. Gaseous propellants such as nitrogen, nitrous oxide, or carbon dioxide can also be used as the propellant and as a part of the composition, the amount of such gaseous propellant being sufficient to provide an initial pressure from 25 to 75 p.s.i.g. in the package.

The following specific examples are intended to illustrate more fully the nature of the present invention without being intended as a limitation upon its scope.

Example 1

The following nonaqueous composiiton was prepared in which the parts are by weight:

| Ingredient: | Parts |
|---|---|
| Copolymer of vinyl methyl ether with maleic anhydride, half ethyl ester | 2.0 |
| Acetylated polyoxyethylene derivative of lanolin (10 moles of ethylene oxide per mole of lanolin) | 0.20 |
| Triisopropanolamine | 0.15 |
| Partial (0.5%) octenylsuccinic ester of starch, aluminum salt | 0.50 |
| Ethyl alcohol, qs. to | 100. |

This solution was then charged into a valved pressure container along with five parts by weight of isobutane, 22.5 parts by weight of Propellant 11 (trichloromonofluoromethane) and 22.5 parts by weight of Propellant 12 (dichlorodifluoromethane).

The packaged composition was evaluated by a panel of 20 women who used it in place of their conventional hair spray and who reported that regular use prevented their hair from developing an oily and matted appearance as rapidly as it did when conventional hair spray was employed. They also reported that it was not necessary to shampoo their hair as frequently as when using a conventional set holding hair spray containing no modified starch material.

The composition was further tested for oil absorbing capability by spraying it on a clean glass slide and allowing it to dry to form a solid film. A similar control film was prepared by using a composition containing the same ingredients except that the modified starch material was omitted. The two films were virtually identical in appearance and clarity. A drop of mineral oil was placed on one edge of each slide. The oil drop on the film made from the composition of the present example was totally absorbed, the area of absorption having virtually the same appearance and clarity as the original film. The oil drop placed on the control film, on the other hand, neither spread nor was absorbed by the film under the same conditions.

Example 2

The following composition was prepared in which the parts are by weight:

| Ingredient: | Parts |
|---|---|
| Copolymer of vinyl methyl ether with maleic anhydride, half ethyl ester | 1.6 |
| Diethyl phthalate | 0.3 |
| Stearyl dimethyl amine | 0.3 |
| Partial (0.5%) octenylsuccinic ester of starch, aluminum salt | 0.5 |
| Ethyl alcohol, qs. to | 100. |

This solution was then charged into a valved pressure container along with a mixture of propellants as described in Example 1. The composition was tested by a panel of women with results similar to those obtained in the case of Example 1.

Example 3

The following solution was prepared in which the parts are by weight:

| Ingredient: | Parts |
|---|---|
| Copolymer of vinyl acetate and crotonic acid | 1.2 |
| 2-amino-2-methyl-1,3-propanediol | 0.2 |
| Partial (0.5%) octenyl-succinic ester of starch, aluminum salt | 0.5 |
| Ethyl alcohol | 35.0 |
| Water | 38.1 |

The foregoing solution was packaged in a valved pressure container along with 25 parts by weight of isobutane propellant.

The composition packaged as thus described exhibited substantially the same properties and characteristics as the compositions of Examples 1 and 2.

When the composition is not packaged with a propellant in a pressurized package, it can be applied to the hair by means of an atomizer or other suitable spray device or can be applied by means of a swab, sponge, or comb.

The film which is formed on the hair fibers by applying thereto the composition of the present invention not only absorbs the natural scalp oils which are released onto the hair and at the same time provides hair set-holding characteristics, but in addition, it can be removed from the hair at least to a substantial extent by simple brushing or combing, any absorbed oil being removed from the hair at the same time. While films laid down from conventional hair set-holding compositions on the hair can also be removed by brushing or combing, this action does not remove oils, but merely distributes them along the length of the hair shaft. As in the case of conventional hair-set holding compositions, the film can be removed by conventional shampoo which, of course, also removes any oil on the hair.

What is claimed is:

1. A hair-setting composition comprising a solution in a volatile organic solvent selected from the group consisting of ethyl alcohol and a mixture of ethyl alcohol with up to 70% by weight of water containing from 0.05 to 5% by weight based on the weight of the total composition of a film-forming organic polymer or resin and dispersed therein from 0.05 to 5% by weight, by weight of the total composition, of a starch acid-ester reacted with a water soluble salt of copper, mercury, aluminum, zirconium, iron, chromium, tin, calcium, barium, or strontium, said acid-ester having the formula:

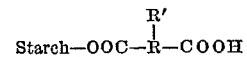

Starch—OOC—R—COOH in which R is dimethylene or trimethylene and R' is a hydrocarbon group from the class consisting of alkyl, alkenyl, aralkyl, and aralkenyl having from 1 to 18 carbon atoms.

2. A hair setting composition as claimed in claim 1 in which R is dimethylene, R' is octenyl, and the polyvalent metal ion is aluminum.

3. A hair setting composition as claimed in claim 2 in which the amount of said polymer or resin is from 0.25 to 3% and the amount of said starch acid-ester reaction product is from 0.2 to 1% by weight of the total composition.

4. A hair setting composition as claimed in claim 2 in which the film-forming organic polymer is a half ethyl ester of a copolymer of vinyl methyl ether with maleic anhydride.

5. A package comprising a pressure-tight container having a valve-controlled outlet and containing a hair setting composition as claimed in claim 1 including in addition a pressure propellant in an amount sufficient to provide an initial pressure from 25 to 75 p.s.i.g.

6. A package as claimed in claim 5 in which R is dimethylene, R' is octenyl, and the polyvalent metal ion is aluminum.

7. A package as claimed in claim 5 in which the film-forming organic polymer is a half ethyl ester of a copolymer of vinyl methyl ether with maleic anhydride, the polymer or resin is present in an amount from 0.25 to 3% by weight of the total composition, the starch acid-ester reaction product is present in an amount from 0.2 to 1% by weight of the total composition, R is dimethylene, R' is octenyl, and the polyvalent metal ion is aluminum.

References Cited

UNITED STATES PATENTS

| 2,723,248 | 11/1955 | Wright | 424—47 X |
| 2,825,727 | 3/1958 | Caldwell | 260—233.5 X |
| 2,995,278 | 8/1961 | Clapp | 424—47 X |
| 3,186,911 | 6/1965 | Rieger et al. | 424—71 X |

ALBERT T. MEYER, Primary Examiner

V. C. CLARKE, Assistant Examiner

U.S. Cl. X.R.

8—127.51; 132—7; 424—Digest 1 and 2, 70, 71, 78, 80, 361